US006719198B2

(12) United States Patent
Bretl et al.

(10) Patent No.: US 6,719,198 B2
(45) Date of Patent: *Apr. 13, 2004

(54) CARD PACKAGE PRODUCTION SYSTEM WITH A MULTIREADER CARD TRACK AND METHOD

(75) Inventors: Robert J. Bretl, Menominee, MI (US); James G. Bretl, Menominee, MI (US)

(73) Assignee: Dynetics Engineering Corporation, Inc., Lincolnshire, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,312

(22) Filed: May 19, 1998

(65) Prior Publication Data

US 2003/0155419 A1 Aug. 21, 2003

Related U.S. Application Data

(60) Provisional application No. 60/047,189, filed on May 20, 1997.

(51) Int. Cl.[7] .................................................. G06K 5/00
(52) U.S. Cl. ........................ 235/380; 235/449; 235/475
(58) Field of Search .............................. 235/380, 492, 235/488, 487, 475, 476, 481, 439, 449, 441; 902/26, 29

(56) References Cited

U.S. PATENT DOCUMENTS

| 4,194,685 A | * | 3/1980 | Hill et al. ..................... 235/375 |
| 4,349,741 A | * | 9/1982 | Bobart et al. ................ 250/568 |
| 4,825,054 A | * | 4/1989 | Rust et al. ................... 235/380 |
| 4,866,545 A | * | 9/1989 | LaManna et al. ............. 360/53 |
| 4,969,760 A | * | 11/1990 | LaManna et al. ........... 400/134 |
| 5,010,239 A | * | 4/1991 | Mita .......................... 235/441 |
| 5,388,815 A | | 2/1995 | Hill et al. ...................... 270/32 |
| 5,433,364 A | | 7/1995 | Hill et al. ..................... 225/96 |
| 5,483,050 A | * | 1/1996 | Fukasawa .................... 235/449 |
| 5,494,544 A | | 2/1996 | Hill et al. ...................... 156/64 |
| 5,503,514 A | * | 4/1996 | LaManna et al. ........... 414/753 |
| 5,509,886 A | | 4/1996 | Hill et al. .................... 493/416 |
| 5,541,395 A | | 7/1996 | Hill et al. .................... 235/380 |
| 5,814,796 A | * | 9/1998 | Benson et al. .............. 235/375 |
| 5,837,991 A | * | 11/1998 | LaManna et al. ........... 235/475 |
| 5,920,055 A | * | 7/1999 | Roth et al. ................... 235/380 |

* cited by examiner

*Primary Examiner*—Karl D. Frech
(74) *Attorney, Agent, or Firm*—James W. Potthast; Potthast & Associates

(57) ABSTRACT

A card package production system (30) for producing card packages each with at least one card (48) bearing card information at a plurality of different card information locations on the card (48) with a card multireader (54) having an elongate card track (52) with a succession of reading stations located along the track (52) with readers for respectively reading the card information at the different locations on the card (48) with means for simultaneously sliding a plurality of the cards (48) along the track (52) in seriatim relationship through the succession of reading stations of the multireader 54 for simultaneous reading of the card information at the different locations on the cards (48) by the multireader (54).

51 Claims, 15 Drawing Sheets

CARD PACKAGE PRODUCTION SYSTEM WITH A MULTIREADER CARD TRACK AND METHOD

CROSS REFERENCE TO RELATED APPLICATION

This application claims benefit of U.S. Provisional Application, No. 60/047,189, filed May 20, 1997, and entitled "Card Package Production System With A Multireader", the contents of which are hereby incorporated by reference.

BACKGROUND OF THE INVENTION

1. Field of the Invention

This invention generally relates to card insertion systems and methods.

2. Description of the Related Art Including Information Disclosed Under 37 CFR 1.197–1.99

Credit card encoding and verification systems which create embossed and encoded information on plastic or metal cards from stored information, such as credit cards, debit cards, and the like are well known. Examples of such apparatus are shown in U.S. Pat. No. 5,494,544 of Hill et al. entitled "Automatic Verified Embossed Card Package Production Methods" issued Feb. 27, 1996.

Likewise, it is known to automatically mount or attach credit cards to, or insert credit cards into, carrier mailing forms by the inserters as shown in U.S. Pat. No. 4,034,210 of Hill et al. entitled "Credit Card Carriers and Methods of Manufacture" issued Jul. 5, 1977; U.S. Pat. No. B1 4,194,685 of Hill et al. entitled "Verifying Insertion System Apparatus and Method of Operation" issued Feb. 19, 1985; U.S. Pat. No. 4,429,217 entitled "Verifying Insertion System and Apparatus" issued Jan. 31, 1984 and U.S. Pat. No. 5,388,815 of Hill et al. entitled "Embossed Card Package Production System with Modular Inserters for Multiple Forms and Verification Apparatus" issued Feb. 14, 1995.

While such combination encoder, verification, and insertion mechanisms have met with some success, they are known to suffer from certain disadvantages. Known systems are not capable of simultaneously reading all of the different sources of card information on the cards and thereby are disadvantageously limited in speed of operation.

SUMMARY OF THE INVENTION

It is therefore the a principle object of the present invention to provide a card package production system for producing card packages, each with at least one card bearing card information at a plurality of different card information locations on the card, with a card multireader having an elongate card track with a succession of reading stations located along the track with readers for respectively reading the card information at the different locations on the card and simultaneously sliding a plurality of the cards along the track in seriatim relationship through the succession of reading stations for simultaneous reading of the information at the different locations on the cards by the readers.

The object is also achieved by having the elongate track providing underlying support of the planer cards with the plane of the cards in a substantially horizontal position and providing a plurality pusher members for pushing the cards along the card track to said succession of reading stations, respectively.

The object is also achieved by providing a plurality of readers that read card information at different locations on the cards are different types of readers which read different types of information, providing a lateral reject station located along the track after the succession of reading stations with means for laterally removing rejected cards from the elongate track which have been improperly coded, and providing a pocket station located along the track after the succession of reading stations, said pocket station including means for laterally removing a card from the track to a pocket position for attachment to a carrier form.

The object is further achieved by providing a computer chip reading assembly including a chip reader with a plurality of contacts for making electrical contact with corresponding terminals of a computer chip carried by the card, mounting the plurality of contacts for lateral movement toward and away from the terminal, and laterally moving said contacts into engagement with the corresponding terminals after the card has been moved to the reading station of the chip reader.

The object is also achieved by providing a control system for the simultaneous sliding including a sensor at each of said plurality of reading stations to detect when a card is present at the reading station.

The object is further achieved by providing a card feeder assembly for feeding cards into the elongate track having a pair of card hoppers for respectively storing two stacks of cards to be read, and providing a pair of picker mechanisms respectively associated with the pair of card hoppers for picking the bottom card of each stack to remove it from the stack, and a bidirectional motor linked to both of the pair of picker mechanisms to selectively drive the picker mechanism in opposite directions to alternatively drive the pair of picker mechanisms to remove the cards from the associated pair of hoppers.

The object is also achieved by providing a method of reading the card information, comprising the steps of simultaneously sliding a plurality of cards along the track in seriatim relationship through a succession of reading stations and simultaneously reading the card information at the different locations on the card with different readers at the succession of reading stations, providing underlying support of the cards with the plane of the cards in a substantially horizontal position, and pushing the cards along the card track to said succession of reading stations, respectively.

The object is also achieved by providing a method of reading card information at different locations including, different types of readers which read different types of information, laterally rejecting cards from the elongate track which have been improperly coded, and laterally removing a card from the track which has been properly encoded to a pocket position for attachment to a carrier form.

The object is further achieved by providing a method including the steps of reading a computer chip carried by the card with a computer chip reading assembly having a chip reader with a plurality of contacts for making electrical contact with corresponding terminals of the computer chip carried by the card, mounting said plurality of contacts for lateral movement toward and away from the terminal, and sliding means for laterally moving said contacts into engagement with the corresponding terminals after the card has been moved to the reading station of the chip reader.

The object is also achieved by providing a method for controlling the simultaneous sliding having a sensor at each of said plurality of reading stations to detect when a card is present at the reading station.

Moreover the object is achieved by providing a method of feeding cards into the elongate track having including the steps of storing two stacks of cards to be read within a pair of card hoppers respectively, picking the bottom card of each stack to remove it from the stack with a pair of picker mechanisms respectively associated with the pair of card hoppers, selectively driving the picker mechanism in opposite directions with a bidirectional motor to alternatively drive the pair of picker mechanisms to remove the cards from the associated pair of hoppers.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DETAILED DESCRIPTION OF THE PREFERRED EMBODIMENT

Figure 1:
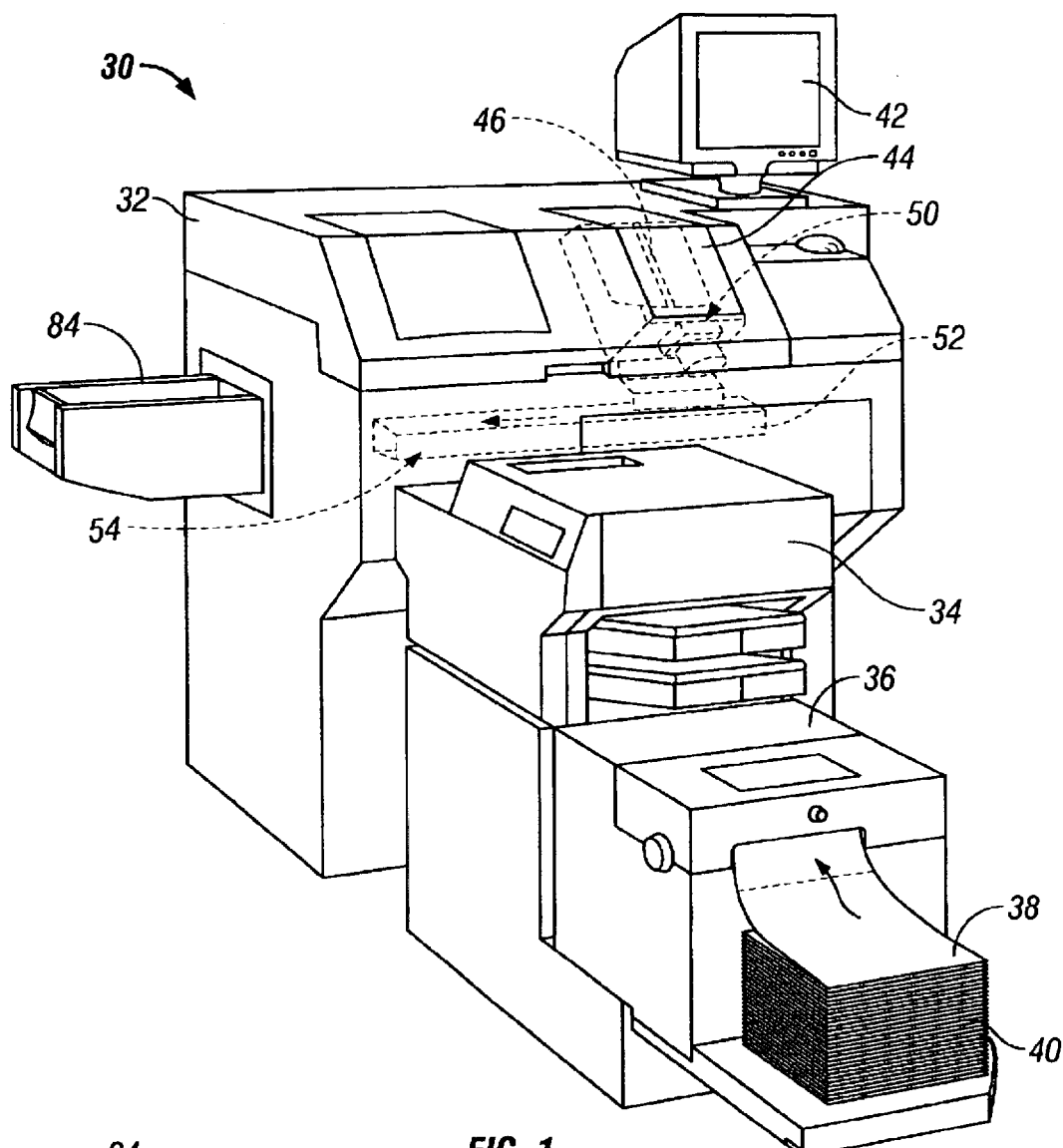
FIG. 1 is a perspective view of the card package production system of the present invention in a configuration that employs an in-line printer to provide carriers to the inserter.

Referring to FIG. 1, the card package production system 30 of the present invention is seen to include an inserter module 32 which is fed single sheet carriers from a carrier printer 34. The carrier printer 34 is fed blank individual carrier forms by a burster 36 which receives continuous, fan-folded blank carrier forms 38 from a supply of carrier forms 40 and separates them into individual single sneet carrier forms which are fed to a carrier form inlet of the printer 34. Associated with the inserter is a computer (not shown) with a CRT display 42 which communicates with the printer 34 to provide it with control signals and the data required by the printer to be printed on the individual carrier forms before being passed to the inserter module 32. The inserter module 32 includes, protectively enclosed in an upper cabinet 44, a card hopper 46 containing a plurality of cards 48, FIG. 2, to be inserted into, or attached to, the individual carrier forms 38. The card hopper 46 is part of a card picker mechanism 50 which functions to selectively place individual ones of the cards 48 onto a card track 52 of a card multireader 54.

Figure 2:
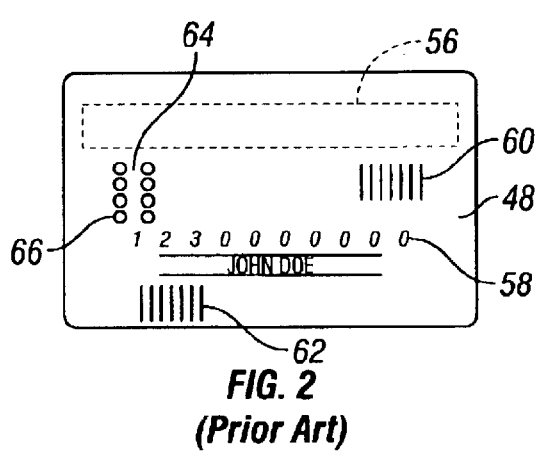
FIG. 2 is an elevational view of the front of a prior art smart card of the type which is inserted into matching carriers by the card package production system of FIG. 1.

Referring to FIG. 2, the card 48 has a plurality of locations at which is place encoded account data. This data is machine readable data found at a mag stripe 56, embossed characters 58, a bar code location 60 on the front of the card, a bar code location 62 on the back of the card and encoded within an IC chip 64 embedded in the card 48 and accessible for communication with a reader by means of IC chip contacts 66. In accordance with the present invention, the multireader 54 functions to read data at all the different locations on the card described above with reference to FIG. 2, selectively compares the data read from the different data locations to determine if there is a match and also selectively compares the read data to data stored in an account data memory associated with the computer, or verification controller, associated with computer display screen 42. In addition, the account information on the carrier 38 printed by printer 34 is compared to the corresponding data read from the various locations on the card 48 in addition to being compared to the account data stored in an account data memory.

Figure 3:
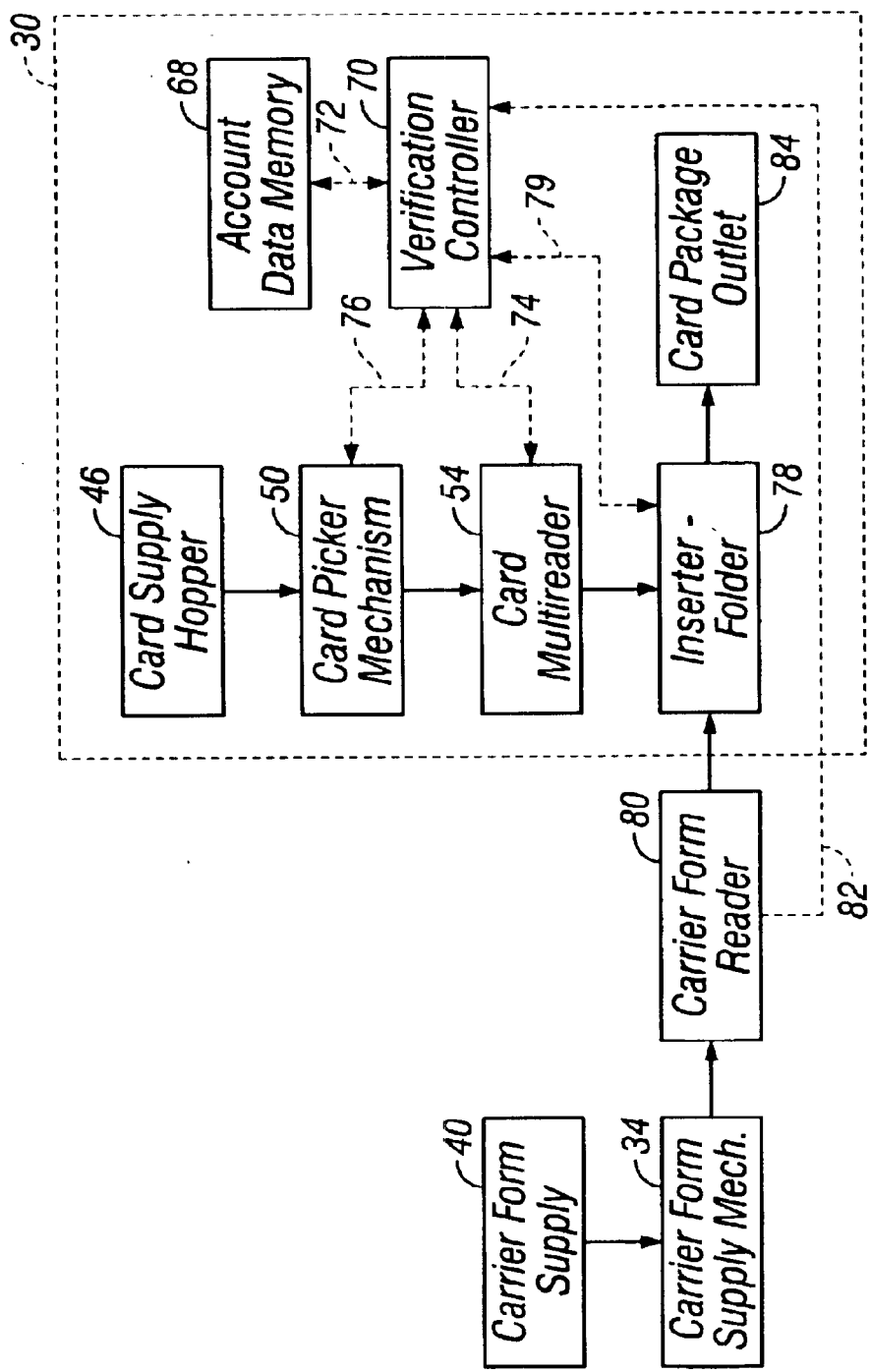
FIG. 3 is a functional block diagram of the insertion card package production system of FIG. 1.

Referring to FIG. 3, the account data memory 68 is connected with a controller 70, or computer, preferably a Pentium computer, via a communication line 72. Received information read from the various data locations on the card 48 from the card multireader 54 is connected via a communication line 74 to the verification controller 70 and is interconnected with the card picker mechanism 50 to control it via a line 76. The verification controller 70 is also interconnected with an inserter folder 78 via a line 79 section of the card package production system 30, and also receives account data read from the carriers 38 from a carrier form reader 80 via a line 82. If there is a match between the account data read at the various locations on the card as described above with reference to FIG. 2 and the account data read from the corresponding carrier 38 and with the corresponding account data in the account data memory 68, the controller 70 controls the inserter folder 78 to insert the card 48 into a carrier 38 to form a card package which is provided to a card package outlet 84 also seen in FIG. 1.

Figure 4:
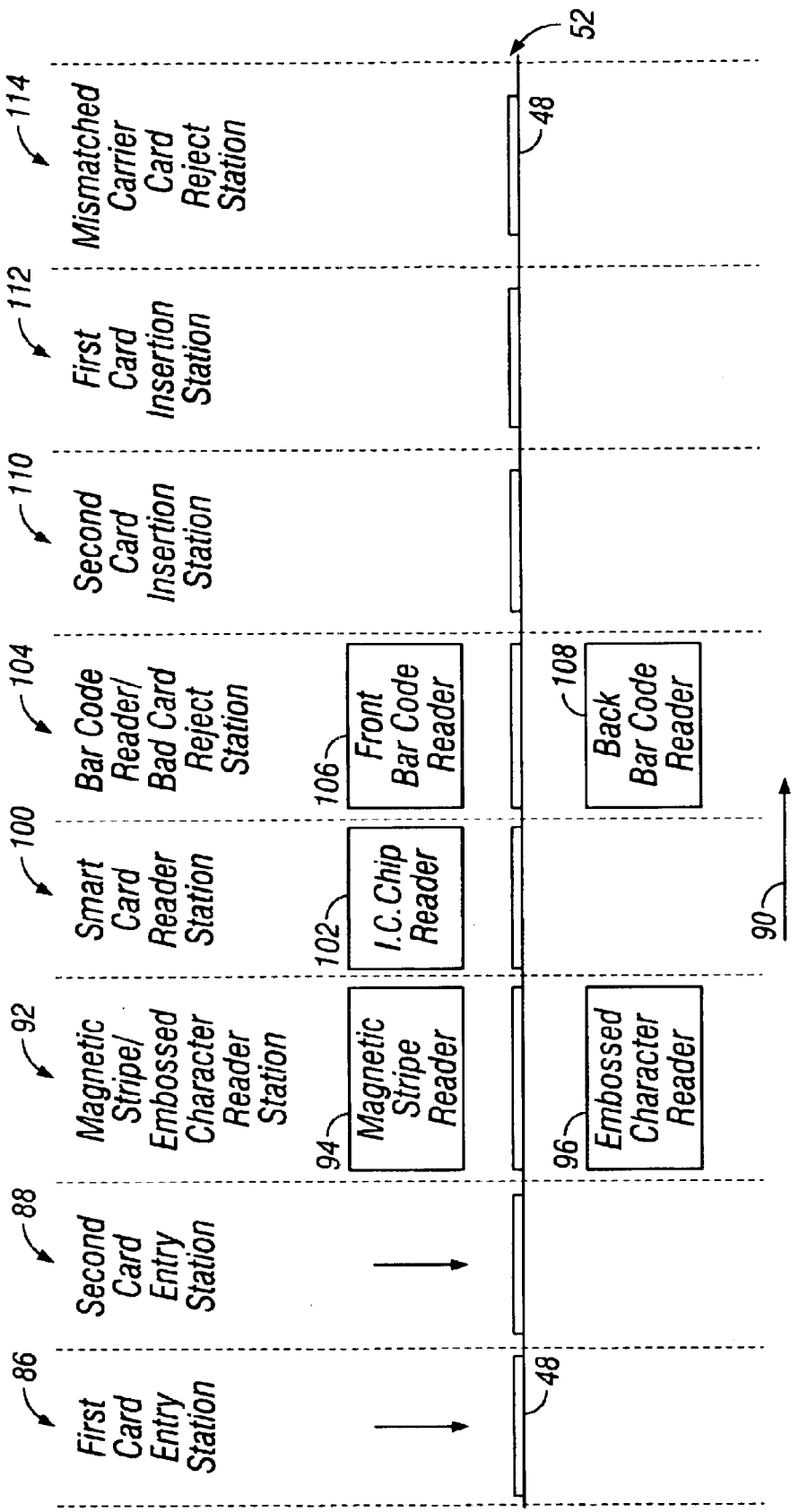
FIG. 4 is a schematic illustration of the various stations of the card track of the card package production system of claim 1 for transporting and reading the data from the card of FIG. 2 at the various data locations.

Referring to FIG. 4, the card track 52 of the multireader 54 has a plurality of stations through which the cards are transported in seriatim spaced relationship. The carrier forms 38 are capable of holding two different credit cards in side by side relationship, and accordingly the card track 52 includes a first card entry station 86 and a second entry station 88 for receiving cards to be inserted into the first and second card pocket locations on the carrier form 48. The card picker mechanism 50 selectively drops cards one at a time onto the card track 52 at the first card entry station 86, the second card entry station 88 or both card entry stations 86 and 88. After the cards 48 are dropped onto the card track 52, they are transported in the direction of arrow 90 to a magnetic stripe/embossed character reader station, or first reader station, 92. At this station, both the encoded data encoded on the mag stripe 56 is read by a magnetic stripe reader 94, and the embossed characters 58 are read by an embossed character reader 96 as the card 48 moves through the first read station 92. The information read by the magnetic stripe reader 94 and by the embossed character reader 96 is fed to the controller 70. If it is determined that there is a match between the information read and the corresponding account data stored in the account data memory 68, then corresponding carrier data stored in the account data memory 68 is retrieved for purposes of printing the carrier form with the appropriate information corresponding to the cards that have been read.

Next, the card 48 is moved to a smart card reader station 100 at which an IC chip reader 102 is provided to make contact with the IC chip contacts 66, FIG. 2, while the card 48 is held stationary, momentarily. Next, the card 48 is moved in the direction of arrow 90 to a third read station, or bar code reader/bad card reject station 104. At this station 104 a first bar code reader 106 is provided for reading the bar code 60 on the front of the card and a back bar code reader 108 functions to read bar code 62 on the back of the card. In addition, at the third read station 104 a bad card reject mechanism is provided to reject and remove any cards from the card track 52 which have been incorrectly prepared as indicated by the failure of the read data at any one data location to match the data read from other locations, to match the corresponding account data stored in the account data memory 68, or both. If the card is not rejected, it is next moved in the direction of arrow 90 to the first card insertion station 112.

If the information read from the carrier 38 matches the card, the data stored in memory 68 or both and there is only one card to be inserted, then the one card is inserted into the carrier at the first card insertion station 112. If, on the other hand, two cards are to be inserted, if the two cards correspond to the carrier information, then the first card is moved to a first card station 112 and the second card to be inserted is moved to the second card insertion station 110. After the first card and second card are in place at the first card and second card insertion stations, both cards are then simultaneously inserted into a matching carrier presuming there is a match. In the event the information read from the carrier 38 does not match or correspond to the corresponding data stored in the account data memory 68 or does not match the account data read from the various data locations on the card 48 or cards 48 which are to be inserted into the carrier, the cards are not inserted into the carrier at the first and second card insertion stations 112 and 110. Instead, the cards are allowed to continue down the card track 52 in the direction of arrow 90 to a mismatched carrier card reject station 114 from where the card 48 is rejected off of the end of the card track 52. Likewise, the mismatched carrier is rejected by suitable rejection mechanism (not shown) associated with the inserter folder 78, FIG. 3.

Figure 5:
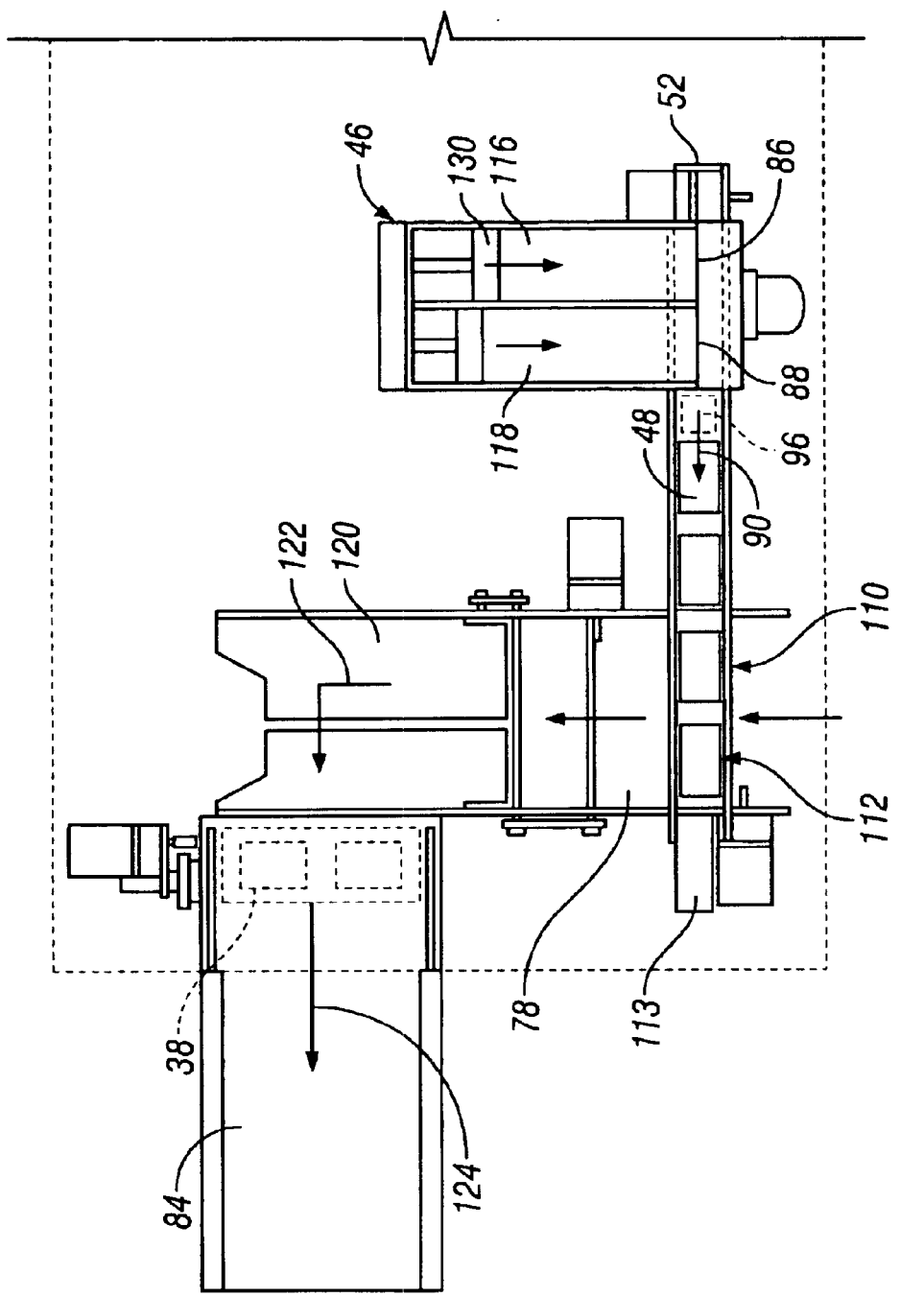
FIG. 5 is a schematic plan view of a portion of the card package production system of FIG. 1 with the cover and cabinet removed to show the card hopper, card picker mechanism, card track inserter, carrier folder and card package outlet in greater detail.

Referring to FIG. 5 and the card track 52, it is seen that the first and second cards 48 are stored or stacked in two separate card stack mechanisms 116 and 118 and are placed onto the track 52 laterally with respect to the direction of movement of the cards 48 on the track 52 as indicated by arrow 90, FIG. 4. The cards 48 then move down the track, as described above with reference to FIG. 3, to the first and second card insertion stations 110 and 112. The cards are then inserted into the carriers by the inserter folder 78 and the folded carriers with the cards inserted, or card packages, are turned at a turning station 120 as indicated by arrow 122 and are then transported out the card package outlet 84 in the direction of arrow 124. Rejected cards fall into a card reject bin 113.

Figure 6:
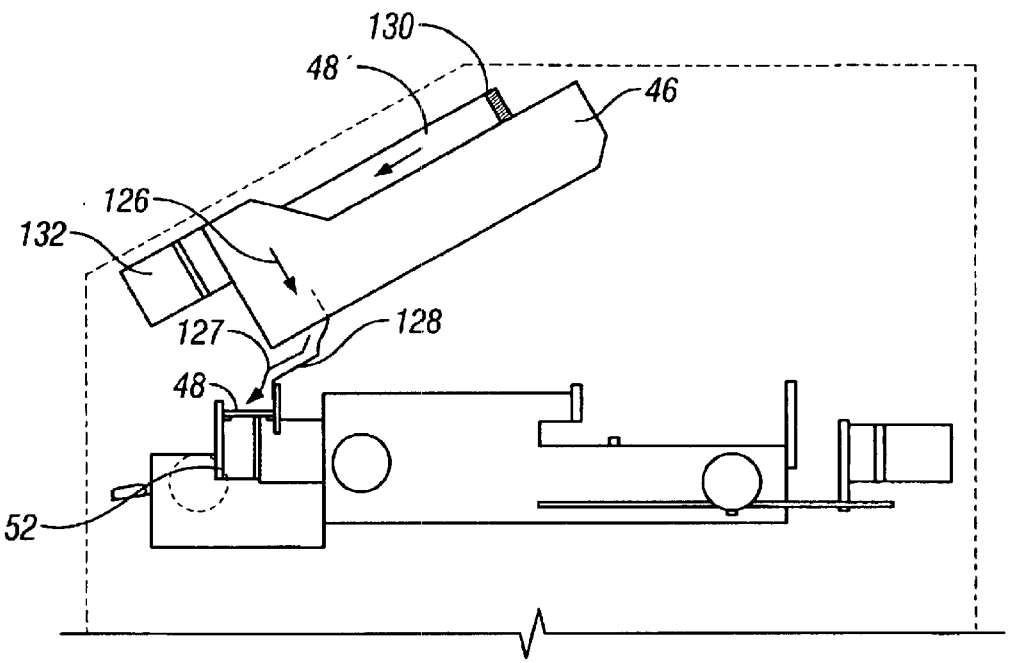
FIG. 6 is a simplified side elevational view of the card hopper and card picker mechanism of FIG. 5.

Referring to FIG. 6, the card hopper 46 is seen to be elevated above the card track at the first card entry station 86 and the second card entry station 88. The cards 48 are contained in the hopper 46 in a stack 48'. During operation of the picker mechanism 46, the bottom card 48 in each stack 48' is slid out from beneath the stack 48' in the direction of arrow 126. Once removed from the bottom of the stack, the card 48 falls on top of a card entry guide 128 which guides the card to fall down onto the track 52 as shown in FIG. 6. As the bottom card 48 is removed from the stack 48', gravity and stack pushers 130, FIG. 5, insure that the next card at the bottom of the stack is moved into the appropriate picking location for removal. The path of the falling card 48 is indicated by arrow 127. The picker mechanism is driven by a reversible electrical motor 132. The picker mechanism is seen to include a pair of picker arm assemblies 134 and 136 which are restrained to ride along guide bars 138 and 140, respectively. In keeping with an important advantage of the invention, both picker arms 134 and 136 are driven for movement along their respective guide rods 138 and 140 alternatively and selectively through use of the single reversible drive motor 132. The drive motor 132 has its shaft linked via a pulley and pulley belt linkage which includes a drive pulley 142 driven directly by the drive shaft of reversible electrical motor 132 and a pulley belt 144 with a pair of opposed ends each connected to the picker arm 134 by a belt connector, such as the picker arm belt connector 146 shown in FIG. 7 interconnecting the end of pulley belt 144 to the picker arm assembly 134. When the picker assembly arm 134 moves down the guide rail 138 toward the cards 48, a picker finger 152 engages the edge of the bottom card 48 in the stack 48' and slides it out from beneath the stack 48' and through a slot 150 at the back wall 152 of the card hopper.

Figure 7:
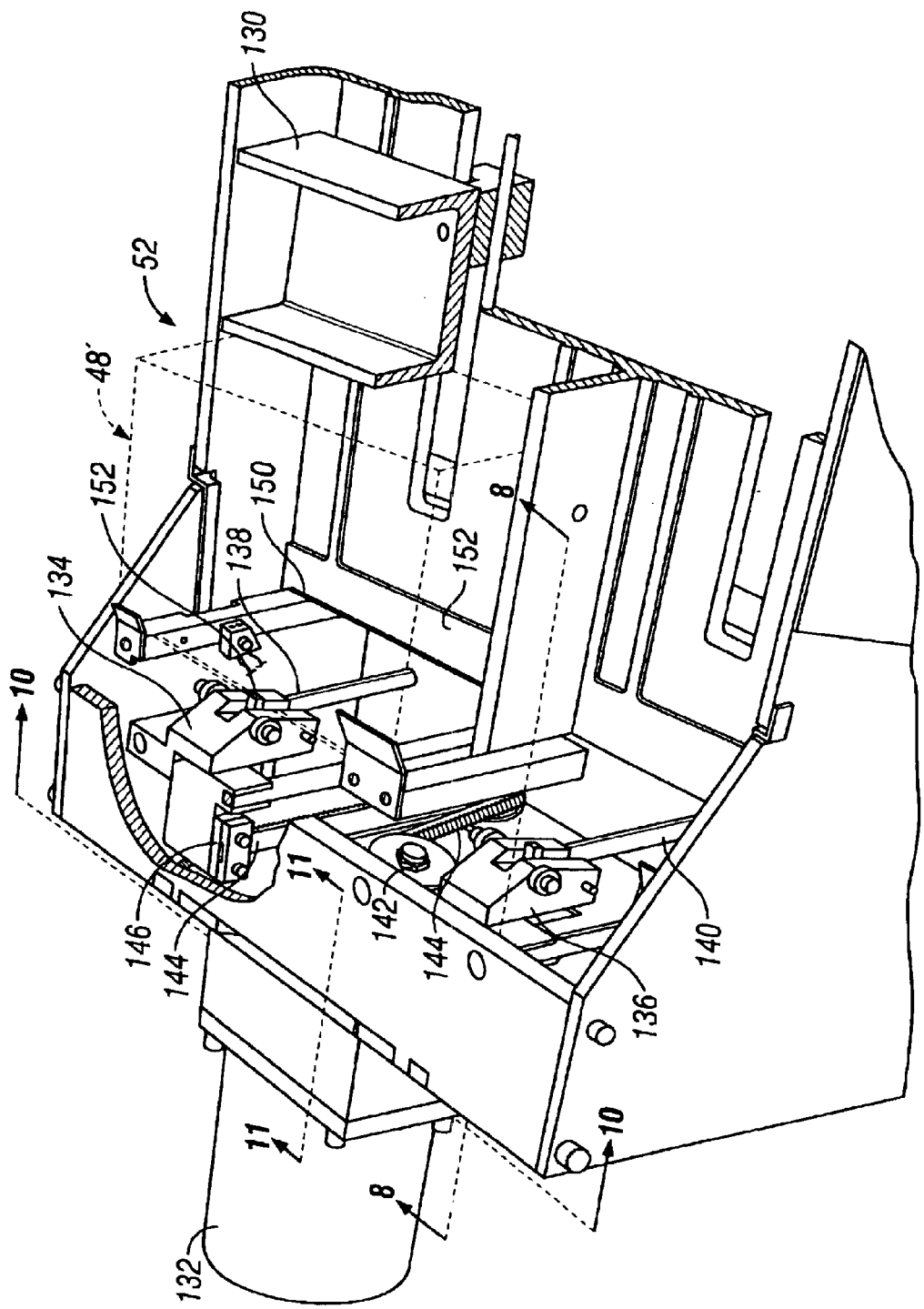
FIG. 7 is a perspective view of the card hopper and associated card picker mechanism of FIG. 6.
Figure 8:
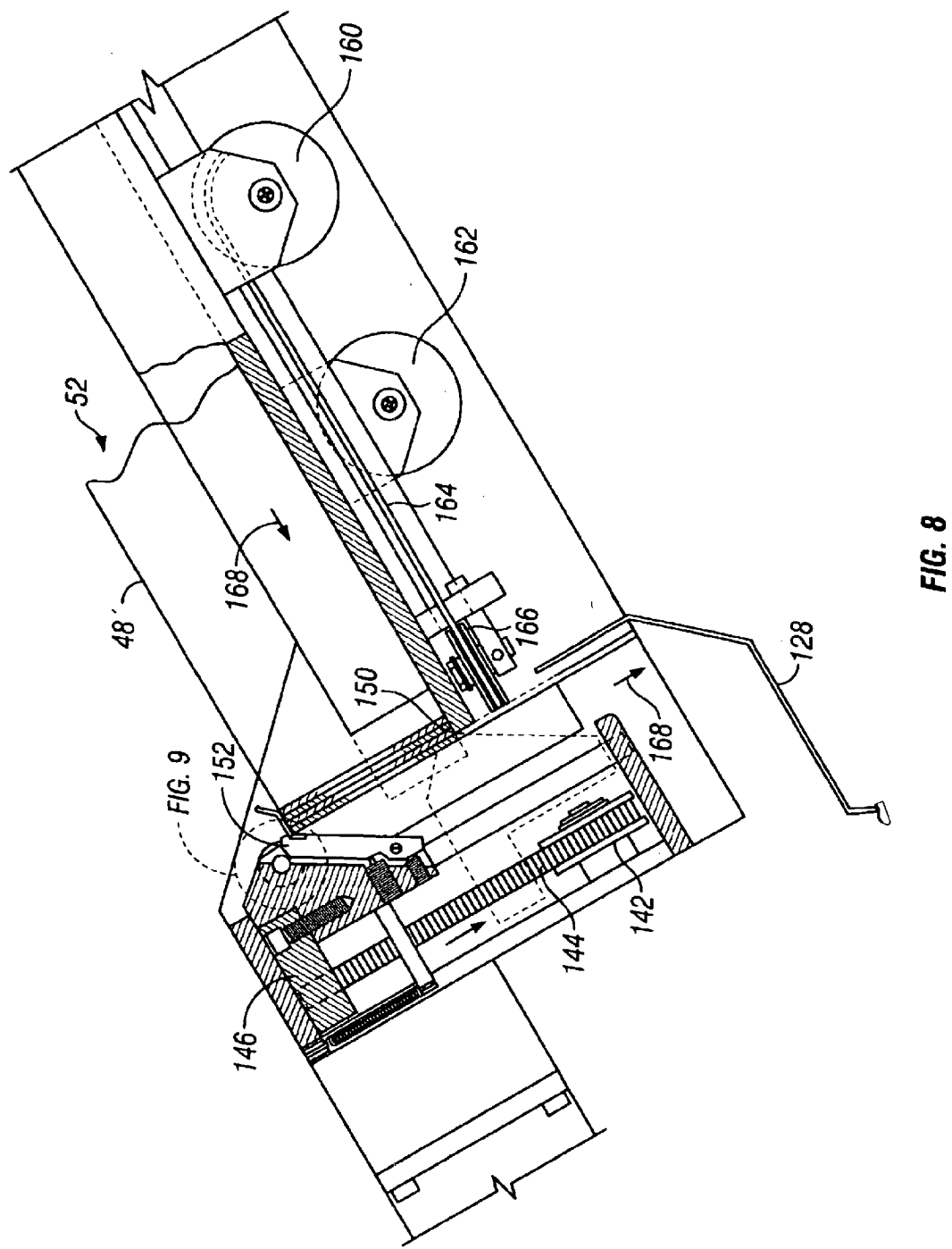
FIG. 8 is a sectional side view of the card hopper and card picker mechanism taken along section line 8—8 of FIG. 7.

Referring now to FIG. 8 which is a cross sectional view of the picker mechanism 52 taken along section line 8—8 of FIG. 7, the card block, or stack pusher, 130 which is used to press down on the stack of cards 48' to insure that the card at the bottom of the stack is in the correct picker position respectively include a constant tension bias spring 160 and 162 which are linked to the card blocks 130 via a linkage including a pulley belt 164 wrapped around an idler pulley 166 and connected at an opposite end to the card block 130. These constant tension springs 160 and 162 spring bias the card block 130 and thus the card stack 48' to move in the direction indicated by arrow 168. When the bi-directional motor 132 drives the drive pulley 142, the picker finger 152 is caused to move toward slot 150 and pushes the bottom card 48 through slot 150 in the direction of arrow 168. Once the bottom card 48 is free from the slot 150, it drops onto the insertion card guide 128.

Figure 9:
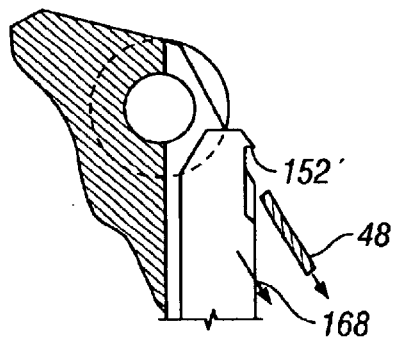
FIG. 9 is an enlarged portion of FIG. 8 to more clearly illustrate the movement of the picker finger into engagement with the card 48.

Referring to FIG. 9, which is an enlargement of the finger 152, the finger 152 has an edge 152' which is substantially the same depth as the thickness of the card 48.

Figure 10:
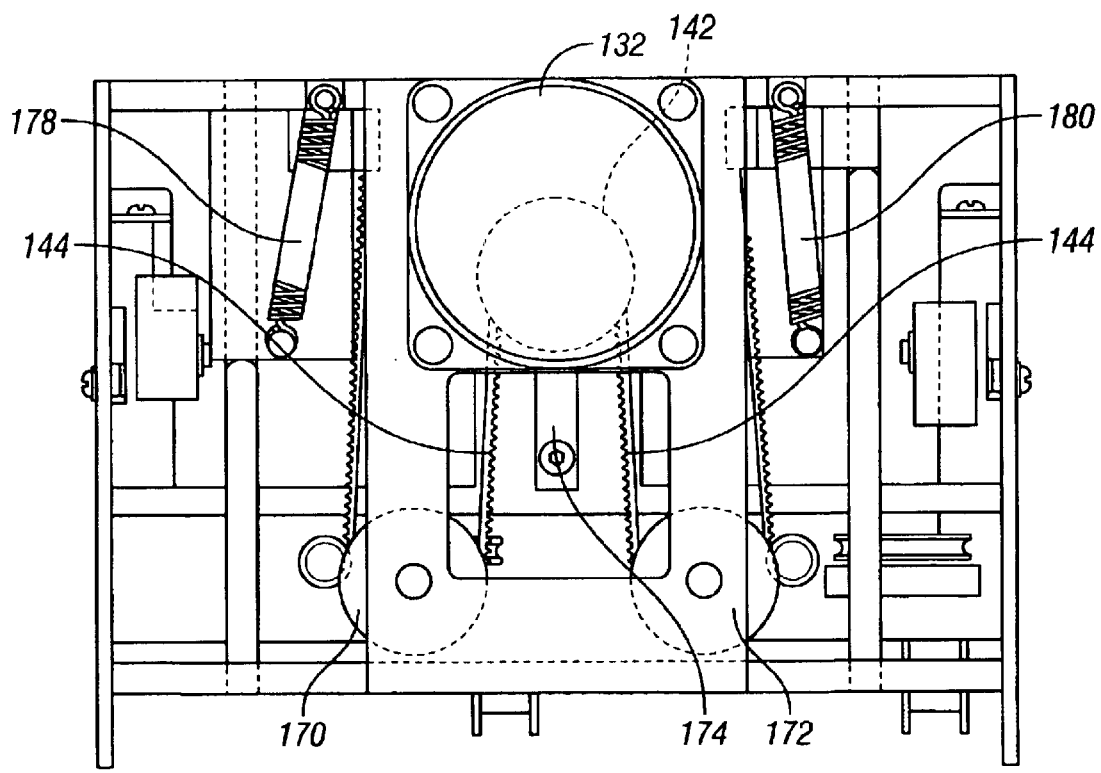
FIG. 10 is a sectional view of the card picker mechanism taken along section line 10—10 of FIG. 7.

Referring now to FIG. 10, which is a sectional view taken through section line 10—10 of FIG. 7, it is seen that the drive motor 132 and its shaft is offset from the center of the drive pulley 142 and that the pulley belt 144 has an intermediate portion between the end fixed to the picker arm assembly and the drive pulley wheel 142 which is wrapped around an idler pulley wheel 170, an opposed portion of the pulley belt 144, on the other hand, attached to the other picker arm 136 at one end is wrapped around another idler pulley 172 before wrapping around the drive pulley 142.

Figure 11:
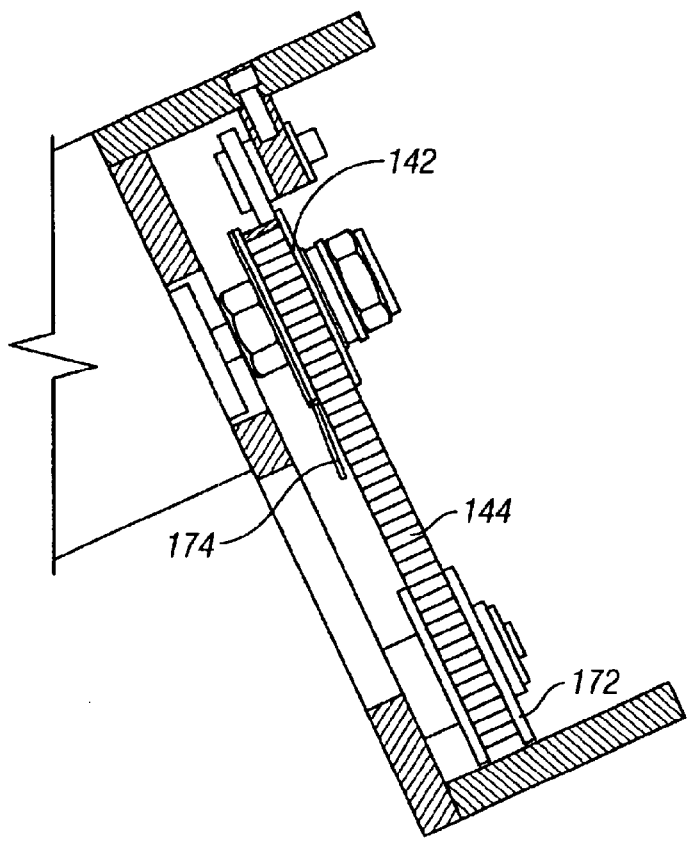
FIG. 11 is a side view of the pulley drive portion of the picker mechanism of FIG. 7.

Referring to FIG. 11, which is an enlarged sectional side view of the pull drive mechanism, it is seen that the drive pulley 142 carries a flag member 174 which is located at a center position when the picker mechanism is in a central neutral position such as shown in FIG. 10. This flag 174 is detected by a sensor (not shown) to determine when the picker mechanism is in its neutral or central position.

Figure 12:
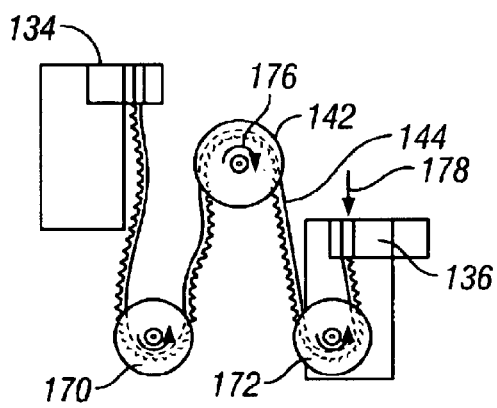
FIG. 12 is a schematic illustration of the single motor drive mechanism when a card is being picked from the first stack of the hopper viewed from the right.

Referring to FIG. 12, when the drive pulley 142 is driven by the electric motor 132 to rotate in a counter-clockwise direction as indicated by arrow 176, the idler pulley 172 rotates in a clockwise direction to pull the picker member 136 downward in the direction of arrow 178 to cause a card from the right hand card hopper associated with picker arm assembly 136 to be removed from the bottom of the card stack 48'. Tension is created in the portion of the pulley member between the drive pulley 142 and the idler pulley 172 while slack is created in the portion of the pulley belt 144 extending between the drive pulley 142 and the idler pulley 170 and between the idler pulley 170 and the left hand picker arm assembly 134, as illustrated in FIG. 12. Preferably, the pulley wheels have serrations or other surface features enhancing frictional engagement between the pulley wheel and the pulley belt which cooperate with pulley teeth on the pulley belt 144.

Figure 13:
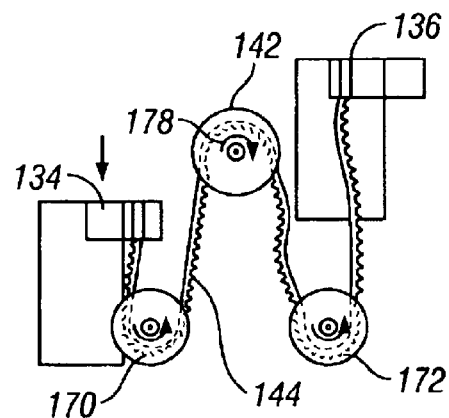
FIG. 13 is a schematic illustration of the single motor picker drive mechanism when it is functioning to pick a card from the left stack of the card hopper.

Referring to FIG. 13, when the drive pulley 142 is driven in a clockwise direction as indicated by arrow 178, the left idler pulley 170 rotates in a counter clockwise direction to lower the left hand picker assembly 134 as the portion of the pulley belt 144 between the drive pulley 142 and the idler pulley 170 is pulled taut. At this same time, the portion of the pulley belt extending between the drive pulley 142 and the idler pulley 172 and between the idler pulley 172 and the end of the pulley belt attached to the picker arm assembly 136 becomes slack.

Referring back to FIG. 10, a bias spring 178 biases the picker arm assembly 134 to move upwardly away from the idler wheel 170 when not being pulled downward by the rotation of the drive pulley 142 in the direction 178 shown in FIG. 13. Likewise, a bias spring 180 spring biases the picker arm 136 to move upwardly away from idler wheel 172 when not being pulled downward due to rotation of the drive pulley 142 in the direction of arrow 176 as shown in FIG. 12.

Figure 14:
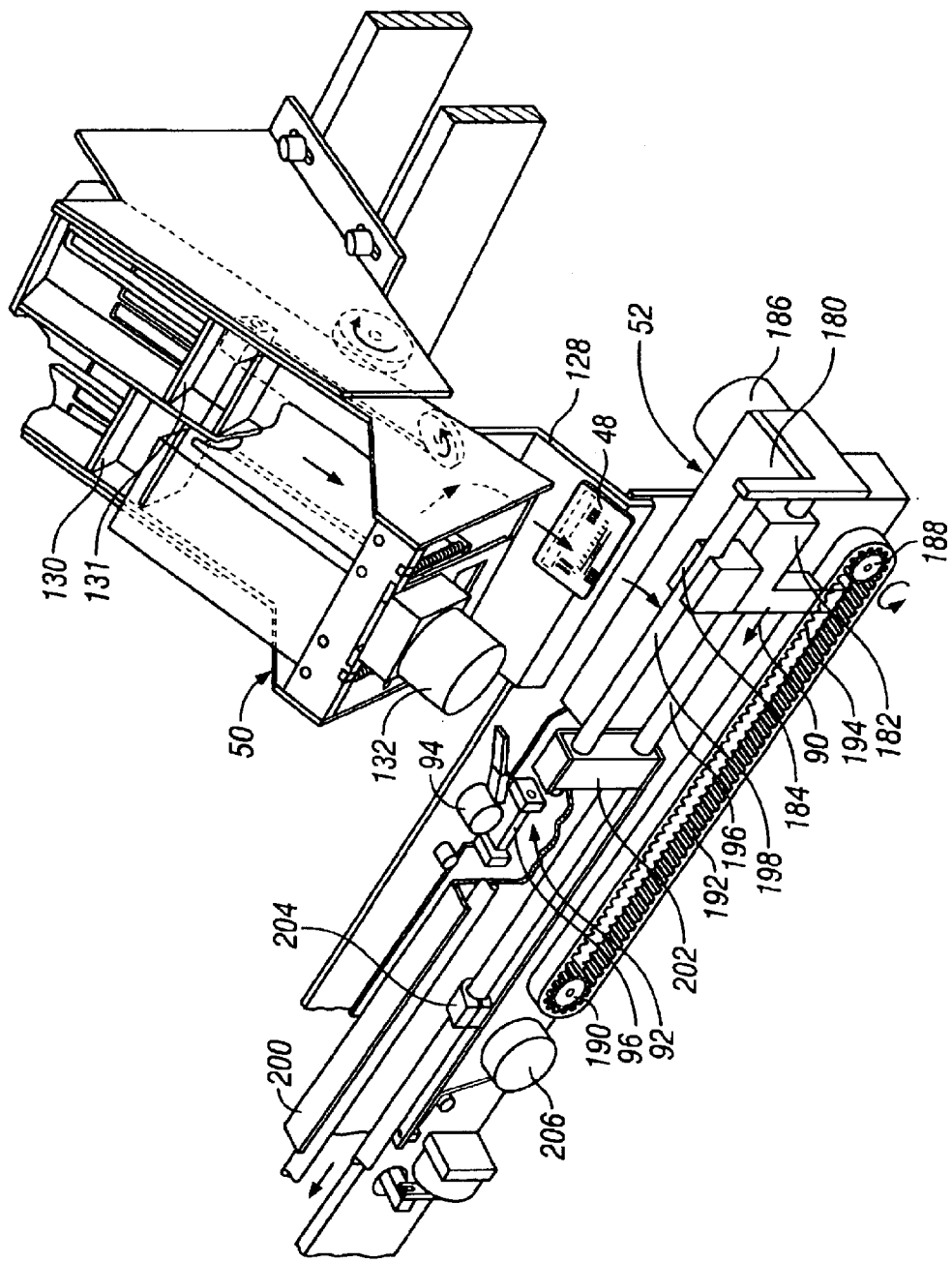
FIG. 14 is a perspective view of the card picker mechanism of FIG. 7 in conjunction with a portion of a preferred embodiment of the card track.

Referring now to FIG. 14, after the card 48 is dropped by the picker mechanism 50 onto the card insertion guide 128, it falls onto the card track 52 at the first card entry station 86 or the second card entry station 88 depending upon from which card stack it is obtained. Alternatively, an in-line card embosser places the cards on the track 52 at station 114. At this point, the card track portion comprises a flat shelf along which the cards shelf 180 along which the cards 48 are slid in a direction indicated by arrow 90. The cards are moved along the track 52 by means of a carriage assembly. The carriage assembly includes a first carriage 182 with at least one pusher 184 for pushing the cards 48 from the first card entry station 86 and the second card entry station 88 located beneath finger mechanism 52 to the first reading station 92, FIG. 4, at which are located the magnetic stripe reader 94 and the embossed character reader 96. The first carriage 182 is driven to move in the direction of arrow 90 by means of an electrical motor 186 which drives a drive pulley 188 to move in the direction to rotate in a counter clockwise direction. The drive pulley wheel 188 is connected to an idler pulley wheel 190 by way of a pulley belt 192 and the pusher member 184 of the first carriage 182 is directly attached to the top of the pulley belt 192 by means of a pulley belt connector 194. Consequently, when the drive pulley wheel 188 rotates in a counter clockwise direction, both the top of the pulley belt 192 and the first carriage 182 carrying the pusher member 184 move in the direction of arrow 90. The carriage 182, as seen in FIG. 14, rides along a pair of guide bars 196 and 198 which extend above and parallel with the portion 180 of the card track. The first carriage 182 is caused to move to a central home position before cards are dropped from either the stacks of the picker mechanism 50. In the case of a card being dropped from the right hand stack associated with card block 131, the pusher 184 remains in the central home position until after the card falls down onto the portion 180 of the track. It is then caused to back over the card, moving in a direction opposite of that indicated by arrow 90 until its pusher member can engage the edge of the card on the far right side. The first carriage assembly 182 then moves to the left in the direction of arrow 90 to push the card toward the first read station 92. In the event of a card being dropped from the left hand stack of cards associated with block member 130, the pusher member 184 is caused to move to the right in a direction opposite arrow 90 along with carriage 182 to move out of the path of the dropping card. After the pusher member 184 moves out of the path of the dropped card 48, by moving in a direction opposite to arrow 90, after the card is dropped, it again moves in the direction of arrow 90 to push the card toward the first read station 92.

Still referring to FIG. 14, the second carriage 200 is also mounted for slideable movement on the guide rods 196 and 198 and, as will be explained in detail with subsequent drawings, carries a plurality of pusher members similar to pusher member 184 for moving the cards along the remainder of the card track to the remaining stations 92, 100, 104, 110, 112 and 114. An end portion 202 of the second carriage 200, when engaged by the first carriage 180 when moving in the direction of arrow 90, is pushed thereby to also move along the card track in the direction of arrow 90. Thus, the second carriage is driven by first carriage 182 which in turn is driven by the motor 186 and the associated pulley system. When the end portion 202 engages a stop member 204, it is prevented from moving further to the left. When the first carriage 182 moves to the right in a direction opposite to arrow 90 after engaging the second carriage 200 and moving it to the left, a constant tension coil spring 206 spring biases the second carriage 200 to move to the right 182 due to the spring bias until another stop member described below is engaged.

Figure 15:
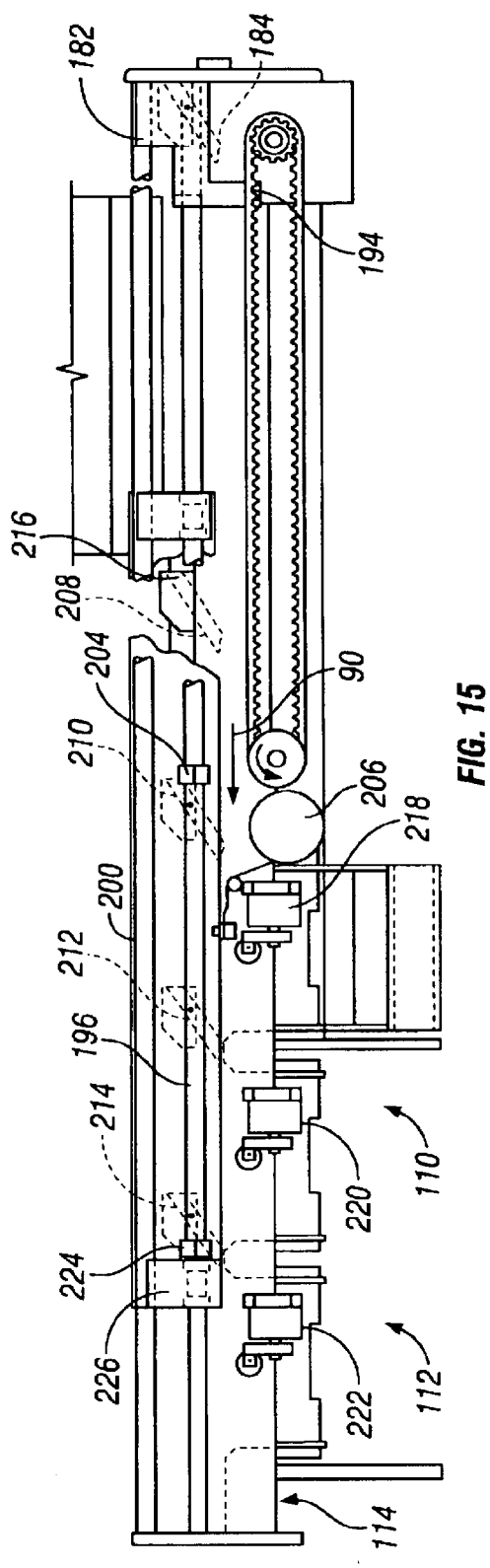
FIG. 15 is a side view of the entire card track of FIG. 14 when the first carriage is disengaged from the second carriage.

Referring now to FIG. 15, the second carriage 200 is seen to carry at spaced locations pusher arms 208, 210, 212 and 214 to enable four different cards 48 to be pushed by the first carriage 200 along the card track in spaced relationship, simultaneously. Each of the pusher arms is pivotally mounted to a pivot axis that is transverse to the elongate direction of the card track, such as pivot axis 216 of pusher member 208. When the second carriage 200 is moving to the left of the direction of arrow 90, the pivotally mounted pusher members rest against the edge of the card in front of them and push them to the left. However, when the carriage 200 moves to the right in a direction opposite to arrow 90, the pusher members pivot in a clockwise direction and ride over the tops of the cards.

Located at the bar code reader/bad card reject station 104 is a reject mechanism that will be described in detail below which is operated by means of a solenoid 218 to enable lateral removal of a rejected card from the card track. Likewise, at the second card insertion station 110 and the first card insertion station 112, there are acceptable card removal mechanisms for releasing the first and second cards for insertion which are operated by solenoids 220 and 222. Restraining movement of the second carriage in a direction opposite to directional arrow 90 is a stop member 224 mounted on the lower guide rod 196 which engages another end portion 226 of the first carriage 200 to prevent further movement to the right upon engagement. As shown in FIG. 15, the first carriage 184 is disengaged from the second carriage 200 and the first carriage 200 has been moved to a home position by constant tension coil spring 206 with blocking member 224 in blocking engagement with end portion 226.

Figure 16:
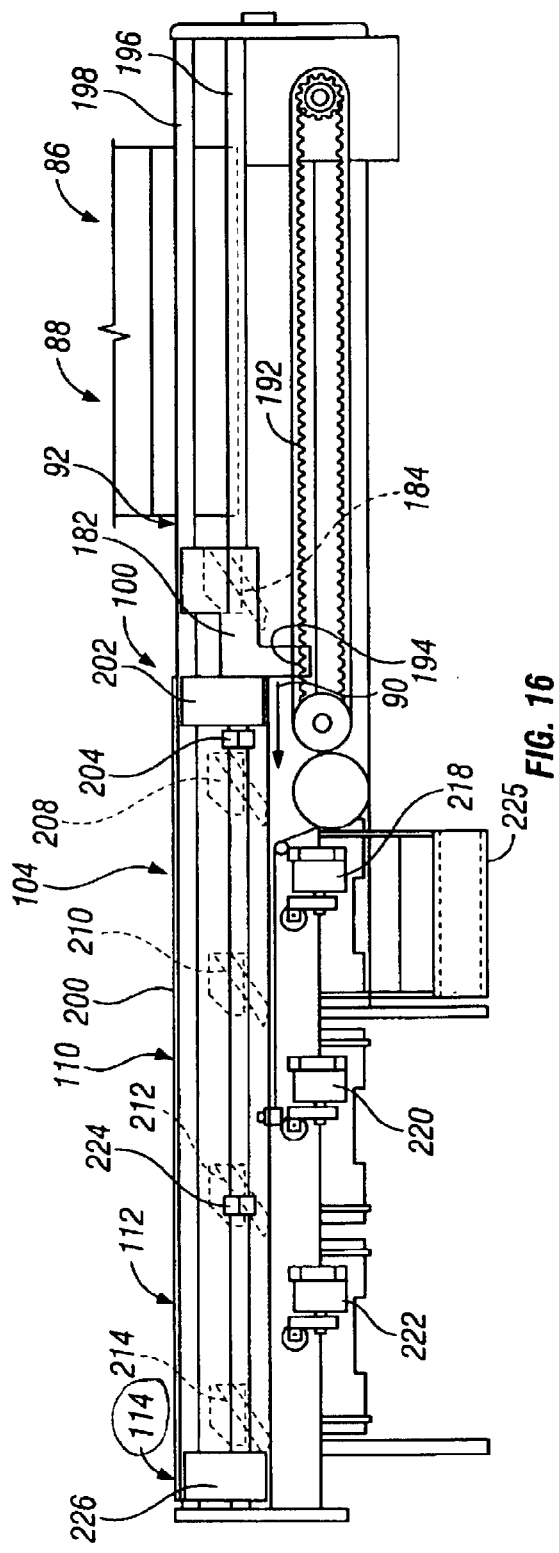
FIG. 16 is another side view of the card track similar to that of FIG. 15 but in which the first carriage is in engagement with and has moved the second carriage.

Referring now to FIG. 16 which is another side elevational view of the card track 52, the first carriage 182 has been driven to move to the left in the direction of arrow 90 relative to the extreme right position it assumes when picking up the card 48 from the first card entry station position as shown in FIG. 15. The first carriage 182 has been driven to this position by virtue of the pulley linkage drive mechanism 194. In this position, the first carriage 182 with its pusher member 184 is at its extreme left position in which it is engaging the end portion 202 of the second carriage 200 and push it along guide rods 196 and 198 until the end portion 202 has been stopped by engagement with stop member 204. At this extreme location, pusher member 214 is at station 114; pusher member 212 is at the first card insertion station 112; pusher member 210 is at the second card insertion station 110; and pusher member 208. Pusher member 208 is located at the bar code reader/bad card reject station 104. These three stations 112, 110 and 104 respectively have associated therewith solenoids 222, 220 and 218 to enable removal of the cards from the card track 52. In the case of solenoid 220 and 222 at stations 110 and 112, the cards are dropped off the track into position to be attached to the carrier form by the inserter folder 78 as shown in FIG. 5. The pusher member 184 of the first carriage 182 is therefore located at the smart card reader station 100.

Figure 17:
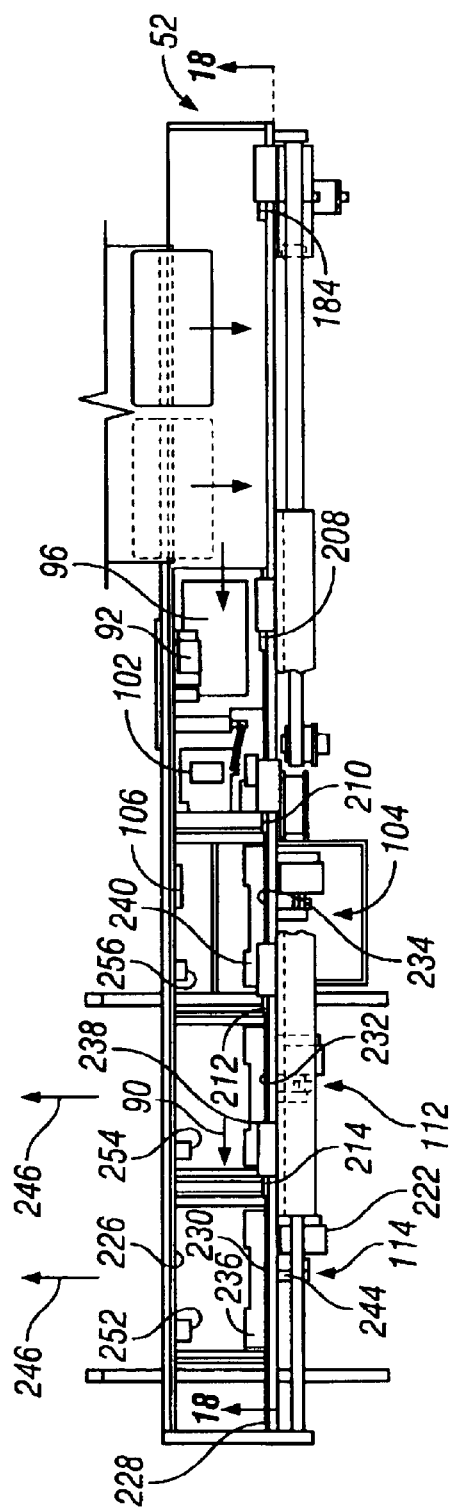
FIG. 17 is a plan view of the card track of FIG. 15.
Figure 18:
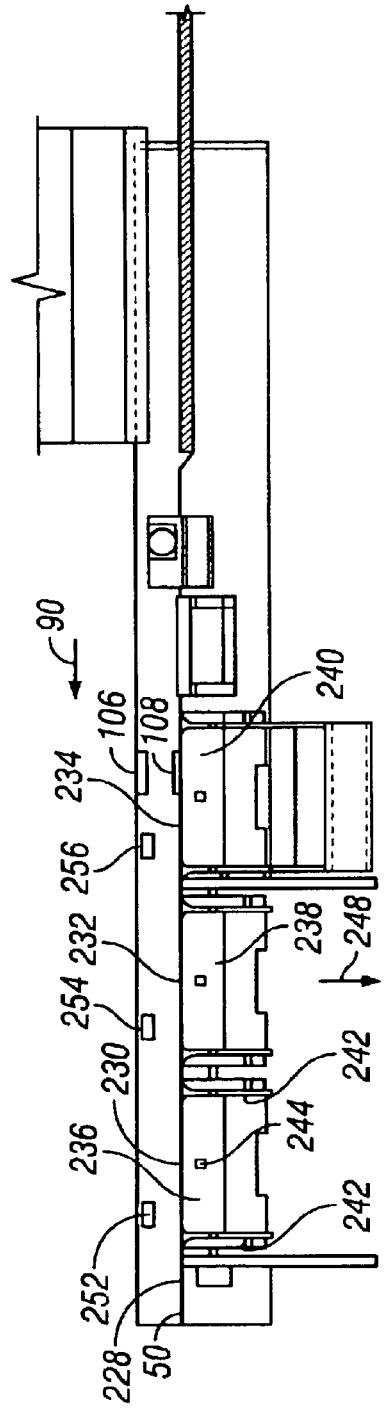
FIG. 18 is a side view of a section of the card track taken along section line 18—18 of FIG. 17.

Referring now to FIG. 17, the card track 52 at the card insertion stations 112 and 110 and at the bad card reject station is defined by a pair of rails 226 and 228. The card 48 spans the space between the rails 226 and 228 and is supported thereon only at its opposed parallel edges. At the stations 114, 112 and 104 the track 228 is defined by the top edges 230, 232 and 234 of pivotally mounted card support members 236, 238 and 240, respectively. Each of the card support members 236, 238 and 240 is mounted for pivotal movement about 242 of card support member 236 as best seen in FIG. 18.

Referring to FIG. 17, an arm 244 of solenoid 222 which is attached to the card support member 236 when energized moves the arm 244 and the edge 230 of support member 236 in a direction opposite to directional arrows 246. This removes the underlying support from the edge of the card 248 being supported thereby which causes the card to pivotally drop off of the tracks 228 and 226 downwardly in the direction of arrow 248, FIG. 18. In the case of the mismatch carrier card reject station 114, none of the solenoids associated with the card support members 244, 238 and 240 are actuated and the card is allowed to continue to be pushed off of the track at the end 250 by pusher member 214. Each of the stations 114, 112 and 104 have reflective photosensors 252 for securing the presence of cards and at the rejection station 104 are located two bar code readers.

Figure 19:
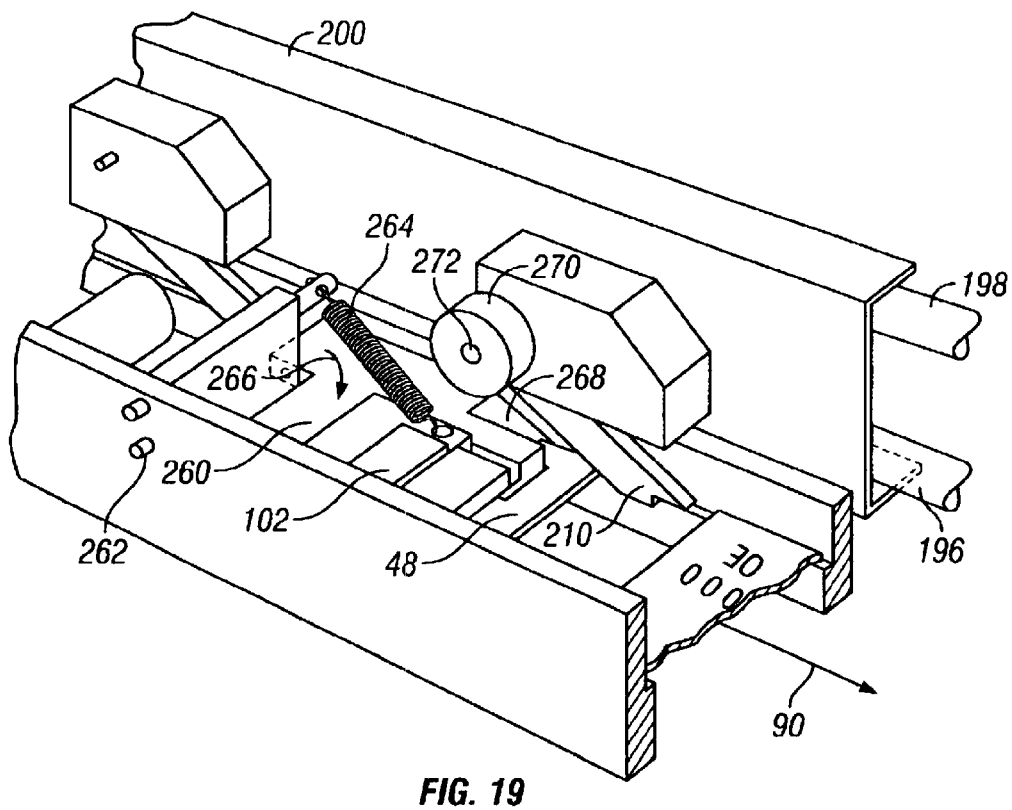
FIG. 19 is an enlarged perspective view of a portion of the card track including the IC chip reader and pusher fingers.

The IC chip reader 102 as seen in FIG. 17 is illustrated in greater detail in FIG. 19 and the series of drawings FIGS. 20A, 20B, 20C and 20D. Referring to FIG. 19, the IC chip reader 102 is carried by a reader holder 260 mounted for pivotal movement about a pivot axis 262. A bias spring 264 spring biases the IC reader mounting member 260 to pivot in a direction opposite to that indicated by arrow 266 to a relatively elevated position in which the card 48 is enabled to pass beneath the IC chip reader 102 without engagement. However, the mounting member 260 has a ramp 268 upon which rides a roller 270 rotatably mounted to the same pivot axis 272 as the pusher finger 210. When the second carriage 200 moves in a direction opposite to that of arrow 90 to push the card 48 to the next station 104, the roller 272 rolls up the ramp 268 and presses the IC chip reader mounting member 260 downwardly in the direction of arrow 266 which causes the IC chip reader to engage the contacts 66 after the movement of the card 48 has stopped. The IC chip is then read and the next card 48 at the previous station 92 is moved into a position beneath the IC chip reader 102.

Figure 20A:
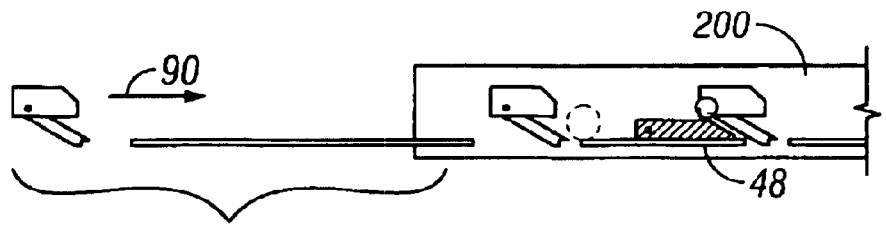
FIGS. 20A, 20B, 20C and 20D are side view schematic illustrations of a portion of the card track associated with the movement illustrating the sequence of steps for moving the IC chip reader into and out of reading engagement with the cards.
Figure 20B:
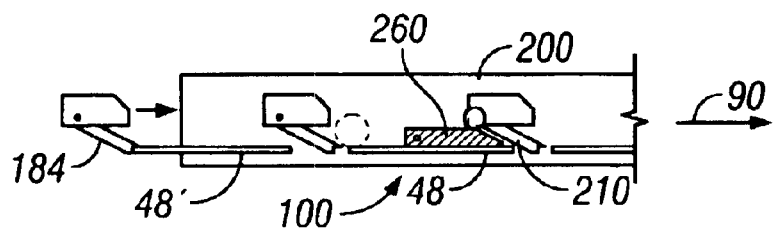
Figure 20C:
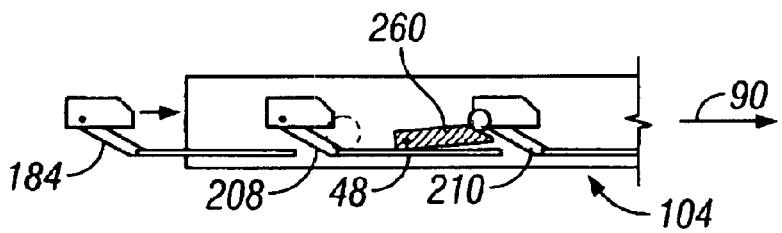
Figure 20D:
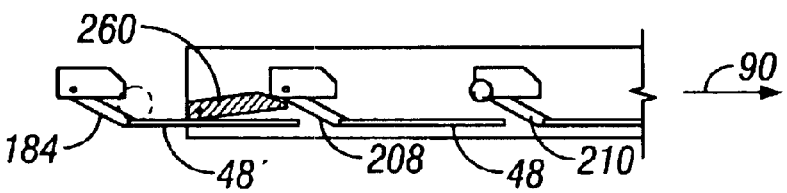
Figure 21:
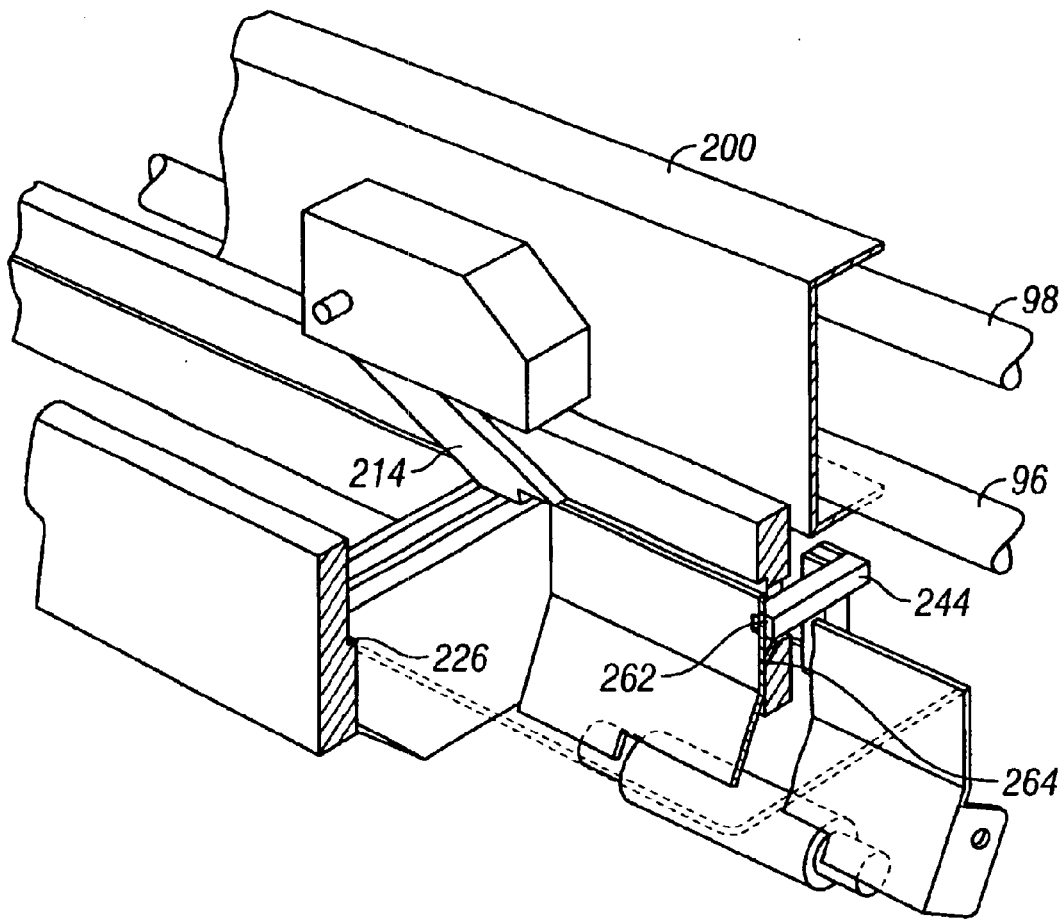
FIG. 21 is an enlarged perspective view of a portion of the card track illustrating the removal mechanisms for removing cards from the card track at the reject station and the card insertion stations illustrated in FIG. 4.
Figure 22:
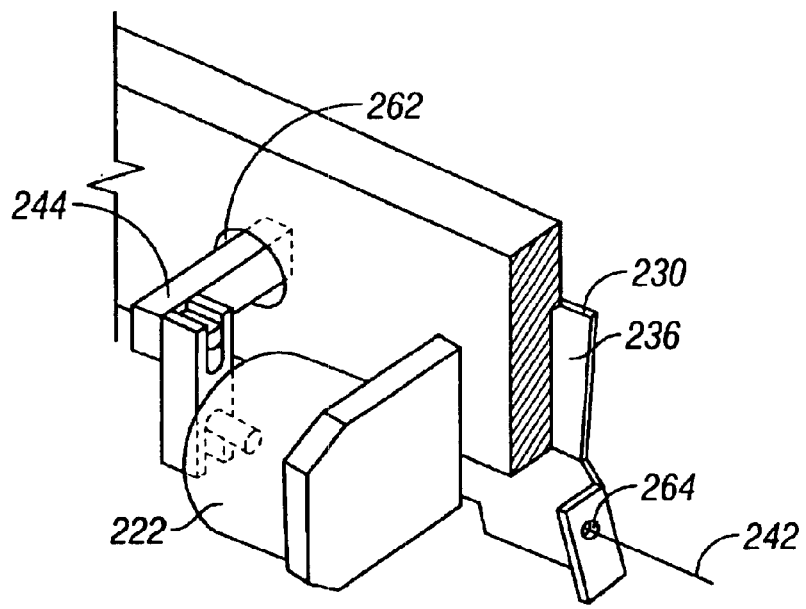
FIG. 22 is another perspective view of a portion of the card support mechanism of FIG. 21.
Figure 23:
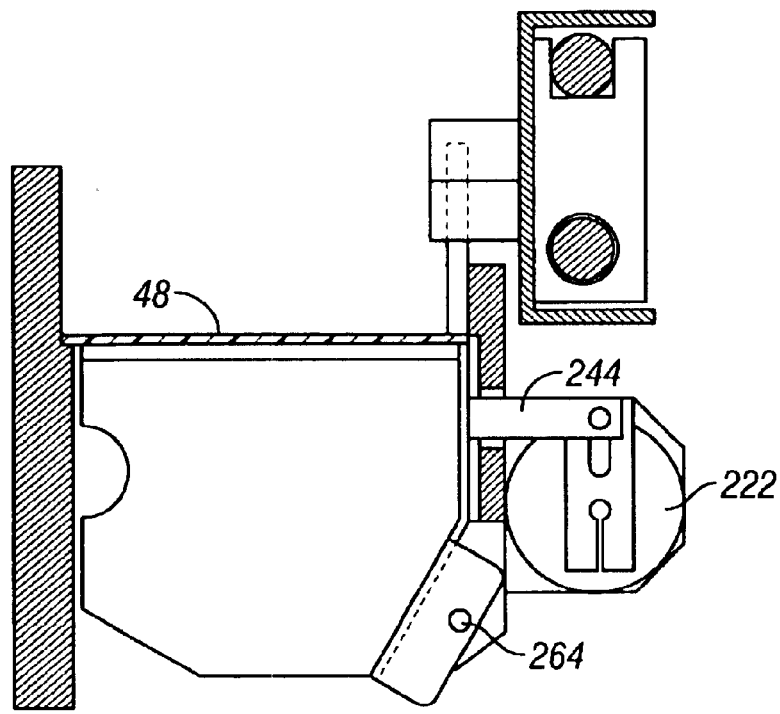
FIG. 23 is a sectional end view of the card support mechanism of FIGS. 21 and 23 showing the card being supported by the support mechanism.
Figure 24:
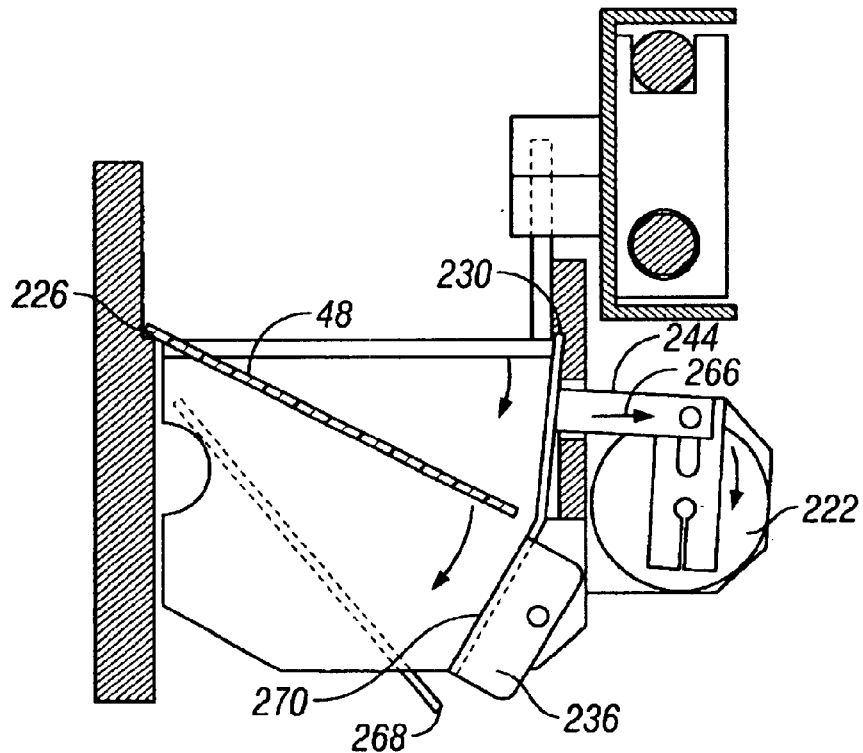
FIG. 24 is a sectional side view similar to that of FIG. 23 but in which the card support mechanism has been moved to a nonsupport position.

Referring to the drawing sequence of FIGS. 20A, 20B, 20C and 20D and the IC chip reader mounting member 260 and IC chip reader 102 has been pressed down and engaged with the card 48. In FIG. 20B the carriage is moving in the direction of arrow 90 and a next successive card is being moved toward the IC chip or smart card reader station 100. In FIG. 20C the carriage 200 is moved further to the right in the direction of arrow 90 and moved down the ramp to enable the IC chip reader mounting member 260 to pivot upwardly to a position in which the card 48 is enabled to pass beneath the IC chip reader 106 carried by the mounting member 260. The pusher 208 then commences pushing the card 48 from beneath the IC chip reader mounting member 260 and toward the next station 104. In FIG. 20D, when the carriage moves to the left in a direction opposite to arrow 90, the next card 48' has been pushed into position at smart card reader station 100 to be read and the pusher 208 passes over the IC chip reader mounting member 260 without engagement. Referring now to FIGS. 21, 22, 23 and 24, the operation of the card drop mechanism associated with the reject station 104 and the second and first card insertion stations 110 and 112 are illustrated in greater detail. As seen in FIG. 21, the solenoid arm, such as solenoid arm 244, passes through an opening 262 in a support wall 264 and the support member 236 is mounted for pivotal movement about a pivot axis passing through a pivot axle bearing hole 264, FIG. 22. When the solenoid is not actuated, the support member 236 is maintained in the supportive position seen in FIGS. 22 and 23 in which the card is supported on the edge of the support edge 230 of the support member 230. However, when the solenoid 222 is actuated, it is caused to move in the direction of arrow 266 which pivots the support member 236 and the support edge 230 away from supportive position as shown in FIG. 24. In that event, the card falls off of the card track, pivoting downwardly about support edge 226, while the supported edge of the card 268 is restrained in its downward movement by a lower segment 270 of the support member 236.

It should be appreciated that to the extent the details of the various apparatus referred to or shown herein are not described or shown herein, they form no part of the present invention. If such details are desired, reference should be made to one or more of U.S. Pat. No. 5,388,815 issued Feb. 14, 1995 to Hill et al. entitled "Embossed Card Package Production System With Modular Inserters For Multiple Forms"; U.S. Pat. No. 5,433,364 issued Jul. 18, 1995 entitled "Card Package Production System With Burster and Carrier Verification Apparatus"; U.S. Pat. No. 5,494,544 issued on Feb. 27, 1996 to Hill et al. entitled "Automatic Verified Embossed Card Package Production Methods"; U.S. Pat. No. 5,509,886 issued Apr. 23, 1996 to Hill et al. entitled "Card Package Production System With Modular Carrier Folding Apparatus For Multiple Forms"; and U.S. Pat. No. 5,541,395 issued Jul. 30, 1996 to Hill et al. entitled "Card Package Production System With Burster and Code Reader. Reference should also be made to U.S. patent application Ser. No. 08/313,548 filed Sep. 23, 1994 (which is a continuation of filewrapper of Ser. No. 08/036,436 filed Mar. 24, 1993) of Hill et al. entitled "Card Carrier Forms For Automated Embossed Card Package Production System"; U.S. provisional patent application Ser. No. 60/047,195 of Hill et al. entitled "Card Package Production System With A Multireader Card Track and Method" filed contemporaneously herewith; U.S. provisional patent application Ser. No. 60/047,190 (DYN-12) of Hill et al. entitled "Automatic Card Insertion System With Card Multireader and Method" filed contemporaneously herewith; U.S. patent application Ser. No. 08/859,685 (DYN-13) of Hill et al. entitled "Inserter Module Adaptable For Use With Both Preprinted and In-Line Printed Carriers and Method" filed contemporaneously herewith; and U.S. patent application Ser. No. 08/859,295 (DYN-14) of Hill et al. entitled "Printer With Discrete Sheet Load Enhancement Apparatus and Method" filed contemporaneously herewith. All these patents and patent applications are hereby incorporated by reference.

What is claimed is:

1. In a card package production system for producing card packages each with at least one card bearing card information at a plurality of different card information locations on the card, the improvement being a card multireader, comprising:

an elongate card track;
a succession of reading station located along the track with readers for respectively reading the card information at the different locations on the card; and
means for simultaneously sliding a plurality of the cards along the track in seriatim relationship through the succession of reading stations for simultaneous reading of the information at the different locations on the cards by the readers, said card sliding means including a plurality of pusher members for pushing the cards along the card track to said succession of reading stations, respectively.

2. The card package of claim 1, in which
said cards are planar, and
said elongate track provides underlying support of the cards with the plane of the cards in a substantially position.

3. The card package production system of claim 1 in which said card sliding means includes
a carriage assembly,
means for mounting said plurality of pusher members to the carriage assembly in space relationship, and
means for mounting said carriage assembly for movement along the track with the pusher in engagement with the cards to be pushed.

4. The card package production system of claim 3 in which said carriage assembly includes
means for mounting the carriage assembly for reciprocal movement along the track, and in which
said mounting means includes means for pivotally mounting the pusher members to the carriage assembly.

5. The card package production system of claim 4 in which said carriage assembly includes a first carriage with at least one pusher for pushing the cards to a first reading station of the succession of reading stations,
a second carriage with a plurality of pushers for pushing the cards through the succession of reading stations, and
means for mounting both said first carriage and said second carriage for movement relative to each other and relative to the reading stations along the track.

6. The card package production system of claim 5 in which said mounting means includes
a rail,
means for attaching said first carriage for sliding movement along the rail, and
means for attaching the second carriage for sliding movement along the rail.

7. The card package production system of claim 3 in which said carriage assembly includes
a first carriage,
a second carriage,
an electrical motor, and
means for linking the electrical motor to the first carriage to move the first carriage relative to the second carriage when spaced from the second carriage and to push the second carriage along the track with the first carriage when the first carriage engages the second carriage.

8. The card package production system of claim 7 including means spring biasing the second carriage to move to a home position when not engaged by the first carriage.

9. The card package production system of claim 8 in which said spring is a constant tension spring to maintain substantially constant spring bias force on the second carriage as the second carriage moves along the track.

10. The card package production system of claim 7 including
two adjacent card picker locations located along the track, and in which
said linking means includes means for selectively moving the first carriage means to either one of said two card picker locations to slide cards along the track to a first reading station of said succession of reading stations.

11. The card package production system of claim 10 in which said electrical motor is a bidirectional motor, and said linking means includes a closed loop pulley system driven by the bidirectional motor and driving a belt connected to the first carriage to move it along the track.

12. The card package production system of claim 1 in which said readers that read card information at different locations on the card are different types of readers which read different types of information.

13. The card package production system of claim 12 in which said different types of readers include at least two types of readers selected from the group of (a) magnetic stripe reader (b) embossed character reader (c) computer chip reader (d) bar code reader.

14. The card package production system of claim 13 in which said different types of readers include at least three of the types of readers of the group.

15. The card package production system of claim 13 in which said different types of readers includes all four of the types of readers of the group.

16. The card package production system of claim 13 in which one of said successive reading stations includes two of said different types of readers of the group.

17. The card package production system of claim 16 in which said two readers at said one of the successive reading stations are (a) the magnetic stripe reader and (b) the embossed character reader.

18. The card package production system of claim 17 in which the one reading station is a first reading station of the succession of reading stations at which card information is read.

19. The card package production system of claim 18 in which yet another one of said reading stations has a bar code reader.

20. The card package production system of claim 18 in which yet another one of said reading stations has a bar code reader.

21. The card package production system of claim 17 in which another one of said reading stations has a computer chip reader.

22. In a card package production system for producing card packages each with at least one card bearing card information at a plurality of different card information locations on the card, the improvement being a card multireader, comprising:

an elongate card track;

a succession of reading station located along the track with readers for respectively reading the card information at the different locations on the card;

means for simultaneously sliding a plurality of the cards along the track in seriatim relationship through the succession of reading stations for simultaneous reading of the information at the different locations on the cards by the readers; and a lateral reject station located along the track after the succession of reading stations with means for laterally removing rejected cards from the elongate track which have been improperly coded.

23. The card package of production system of claim 22 including an alternative reject station located after the lateral reject station for rejecting cards longitudinally from an end of the track.

24. The card package production system of claim 22 including a pocket station located along the track after the succession of reading stations and said lateral reject station, said pocket station including means for laterally removing a card from the track to a pocket position for attachment to a carrier form.

25. The card package production system of claim 22 in which said laterally removing means includes means for selectively removing underlying support for the rejected cards to enable them to fall off the track.

26. The card package production system of claim 25 in which said support removing means includes a pair of card supports for supporting the card only at a pair of opposite sided edges of the card, means for mounting a movable one of said pair of card supports for movement between a supporting position in which it supports one of said pair of opposite side edges and another nonsupporting position in which it does not support said one of the opposite side edges, and means for selectively moving the one of said pair of card supports from the supporting position to the nonsupporting position.

27. The card package production system of claim 26 in which said selectively moving means includes a solenoid, and means linking the solenoid to the movable one of the pair of supports.

28. The card package production system of claim 26 in which said support removing means includes a pair of card supports for supporting the card only at a pair of opposite side edges of the card, means for mounting a movable one of said pair of card supports for movement between a supporting position in which it supports one of said pair of opposite side edges and another nonsupporting position in which it does not support said one opposite side edge, and means for selectively moving the one of said pair of card supports from the supporting position to the nonsupport position.

29. The card package production system of claim 28 in which said selectively moving means includes a solenoid, and means linking the solenoid to the movable one of the pair of supports.

30. In a card package production system for producing card packages each with at least one card bearing card information at a plurality of different card information locations on the card, the improvement being a card multireader, comprising:

an elongate card track;

a succession of reading station located along the track with readers for respectively reading the card information at the different locations on the card;

means for simultaneously sliding a plurality of the cards along the track in seriatim relationship through the succession of reading stations for simultaneous reading of the information at the different locations on the cards by the readers; and a pocket station located along the rack after the succession of reading stations, said pocket station including means for laterally removing a card from the track to a pocket position for attachment to a carrier form.

31. In a card package production system for producing card packages each with at least one card bearing card information at a plurality of different card information locations on the card, the improvement being a card multireader, comprising:

an elongate card track;

a succession of reading station located along the track with readers for respectively reading the card information at the different locations on the card;

means for simultaneously sliding a plurality of the cards along the track in seriatum relationship through the succession of reading stations for simultaneous reading of the information at the different locations on the cards by the readers; and a pocket station located along the track after the succession of reading stations, said pocket station including means for laterally removing a card from the track to a pocket position for attachment to a carrier form, said laterally removing means including means for selectively removing underlying support for the rejected cards to enable them to fall off the track.

32. In a card package production system for producing card packages each with at least one card bearing card information at a plurality of different card information locations on the card, the improvement being a card multireader, comprising:

an elongate card track;

a succession of reading station located along the track with readers for respectively reading the card information at the different locations on the card;

means for simultaneously sliding a plurality of the cards along the track in seriatim relationship through the succession of reading stations for simultaneous reading of the information at the different locations on the cards by the readers; and in which one of said readers is a computer chip reading assembly including a chip reader with a plurality of contacts for making electrical contact with corresponding terminals on opposite sides of a computer chip carried by the card, means for mounting said plurality of contacts for lateral movement of the contacts toward and away from the terminals on opposite sides of the computer chip, and means connected with the simultaneous sliding means for laterally moving said contacts into sideways engagement with the corresponding terminals after the card has been moved to the reading station of the chip reader.

33. The card package production system of claim 32 in which said mounting means engaging member is a rotary member.

34. The card package production system of claim 33 in which said lateral movement mounting means for the chip reader contacts includes means for mounting the reader contacts for pivotal movement along an axis substantially parallel to the elongate track.

35. In a card package production system for producing card packages each with at least one card bearing card information at a plurality of different card information locations on the card, the improvement being a card multireader, comprising:

an elongate card track;

a succession of reading station located along the track with readers for respectively reading the card information at the different locations on the card, one of said readers being a computer chip reading assembly including a chip reader with a plurality of contacts for making electrical contact with corresponding terminals of a computer chip carried by the card, means for mounting said plurality of contacts for lateral movement toward and away from the terminal, and means connected with the simultaneous sliding means for laterally moving said contacts into engagement with the corresponding terminals after the card has been moved to the reading station of the chip reader; and means for simultaneously sliding a plurality of the cards along the track in seriatim relationship through the succession of reading stations for simultaneous reading of the information at the different locations on the cards by the readers, said simultaneous cards sliding means including a carriage with a plurality of pusher members for pushing the plurality of cards, means for mounting the carriage for reciprocal movement along the track, and in which said laterally moving means including a member carried by the carriage for engaging the mounting means to move the contacts into engagement with the corresponding terminals when the carriage reciprocally moves in a direction opposite to a direction it moves to move the cards to the reading station with said chip reader.

36. The card package production system of claim 35 in which said lateral movement mounting means for the chip reader contacts includes means for mounting the chip reader contacts for pivotal movement along an axis substantially transverse to the elongate track.

37. The card package production system of claim 36 in which said mounting means engaging member is a rotary member.

38. In a card package production system for producing card packages each with at least one card bearing card information at a plurality of different card information locations on the card, the improvement being a card multireader, comprising:

an elongate card track;

a succession of reading station located along the track with readers for respectively reading the card information at the different locations on the card; and means for simultaneously sliding a plurality of the cards along the track in seriatim relationship through the succession of reading stations for simultaneous reading of the information at the different locations on the cards by the readers, and a card feeder assembly for feeding cards inot the elongate track having a pair of card hoppers for respectively storing two stacks of cards to be read, a pair of picker mechanisms respectively associated with the pair of card hoppers for picking the bottom card of each stack to remove it from the stack, a bi-directional electrical motor, and means of for linking the bidirectional motor to both of said pair of picker mechanisms to selectively drive the picker mechanism in opposite directions to alternatively drive the pair of picker mechanisms to remove the cards from the associated pair of hoppers.

39. The card package production system of claim 38 in which said bidirectional motor linking means includes a drive pulley wheel for rotating with the bidirectional motor, a pair of idler pulley wheels mounted on opposite sides of and above the drive pulley wheel, and an elongate pulley belt with a pair of opposite ends connected to said picker mechanism and engaged with and extending over the pair of idler pulley wheels and under the drive pulley wheel.

40. The card package production system of claim 39 in which said picker mechanism includes
a pair of picker pulley connectors fixedly attached to said pair of opposite ends of the pulley belt respectively and including means of slideably mounting said picker pulley connectors on said pair of guide members, respectively.

41. The card package productions system of claim 40 in which said card sliding means slides said plurality of cards along the track intermittently.

42. The card package production system of claim 41 in which said card sliding means slides the cards along the track in seriatim, spaced relationship.

43. In a card package production system for producing card packages each with at least one card bearing card information at a plurality of different card information locations on the card, the improvement being a card multireader, comprising:
an elongate card track;
a succession of reading station located along the track with readers for respectively reading the card information at the different locations on the card; and
means for simultaneously sliding a plurality ,of the cards along the track in seriatim relationship through the succession of reading stations for simultaneous reading of the information at the different locations on the cards by the readers, and said card sliding means slides said plurality of cards along the track intermittently.

44. The method of claim 43, in which said cards are planar, and including the steps of
providing underlying support with the elongate track of the cards with the plane of the cards in a substantially horizontal position.

45. In a card package production system for producing card packages each with at least one card bearing card information at a plurality of different card information locations on the card, the improvement being a method of reading the card information, comprising the steps of:
simultaneously sliding a plurality of cards along the track in seriatim relationship through a succession of reading stations by pushing the cards along the card track to said succession of reading stations, respectively; and
simultaneously reading the card information at the different locations on the card with different readers at the succession of reading stations.

46. The method of claim 44 including the step of reading reading card information with readers at different locations includes, different types of readers which read different types of information.

47. The method of claim 45 including the step of
reading a computer chip carried by the card with a computer chip reading assembly having a chip reader with a plurality of contacts for making electrical contact with corresponding terminals on opposite sides of the computer chip carried by the cared,
mounting said plurality of contacts for lateral movement of the contacts toward and away from the terminals on opposite sides of the computer, and
laterally moving said contacts with means connected with the simultaneously sliding means into sideways engagement with corresponding terminals after the card has been moved to the reading station of the chip reader.

48. The method of claim 45 in which the step of simultaneously sliding includes the step of controlling a sensor at each of said plurality of reading stations to detect when a card is present at the reading station.

49. In a card package production system for producing card packages each with at least one card bearing card information at a plurality of different card information locations on the card, the improvement being a method of reading the card information, comprising the steps of:
simultaneously sliding a plurality of cards along the track in seriatim relationship through a succession of reading stations;
simultaneously reading the card information at the different locations on the card with different readers at the succession of reading stations; and
laterally rejecting cards from the elongate track which have been improperly coded.

50. In a card package production system for producing card packages each with at least one card bearing card information at a plurality of different card information locations on the card, the improvement being a method of reading the card information, comprising the steps of:
simultaneously sliding a plurality of cards along the track in seriatim relationship through a succession of reading stations;
simultaneously reading the card information at the different locations on the card with different readers at the succession of reading stations; and
laterally removing a card from the track to a pocket position for attachment to a carrier form.

51. In a card package production system for producing card packages each with at least one card bearing card information at a plurality of different card information locations on the card, the improvement being a method of reading the card information, comprising the steps of:
feeding cards into an elongate track with a card feeder assembly;
picking the bottom card of each stack to remove it from the stack with a pair of picker mechanisms respectively associated with the pair of card hoppers;
selectively driving the picker mechanism in opposite directions with a bi-directional motor to alternatively drive the pair of picker mechanisms to remove the cards from the associated pair of hoppers;
simultaneously sliding the plurality of cards along the track in seriatim relationship through a succession of reading stations; and
simultaneously reading the card information at the different locations on the card with different readers at the succession of reading stations.

\* \* \* \* \*